United States Patent Office 3,119,815 Patented Jan. 28, 1964

1

3,119,815
NOVEL CORTISONE DERIVATIVES AND PREPARATION THEREOF

Gaston Amiard, Noisy-le-Sec, René Heymès, Romainville, Truong Van Thuong, Clichy-sous-Bois, and Jean Mathieu, Le Raincy, France, assignors to Roussel-UCLAF, Paris, France, a corporation of France
No Drawing. Filed Mar. 12, 1962, Ser. No. 179,201
Claims priority, application France Mar. 14, 1961
21 Claims. (Cl. 260—239.55)

The invention relates to novel cortisone compounds having the formula

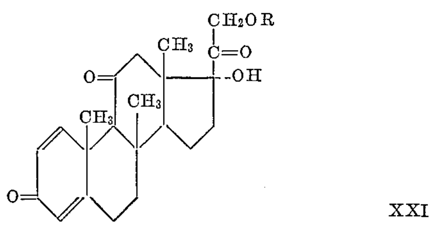

wherein R is selected from the group consisting of hydrodrogen and an acyl radical of an organic carboxylic acid having 1 to 18 carbon atoms. The invention also relates to a novel process for the preparation of compounds of Formula XXI and intermediates thereof.

The novel cortisone compounds possess the activities of compounds of the cortisone series, and particularly antiinflammatory and glucocorticoid activity.

There has already been prepared a great number of methylated derivatives of steroids carrying methyl substituents in the 2-, 4-, 6-, 11-, 14- and 16-positions. By contrast, steroids possessing a methyl group in the 8-position are not known. The only known analogs to these steroids are derivatives of Dipterocarpol described by Crabbe et al. (Tetrahedron 3, 279, 1958) carrying methylated substituents in the 8- and 14-positions. These authors have particularly degraded Dipterocarpol into 8,14-dimethyl-18-nortestosterone which has no relationship with the compounds of Formula XXI.

It is an object of the invention to obtain the novel compounds 8β-methyl-$\Delta^1$-cortisone and its organic carboxylic acid esters.

It is another object of the invention to provide a novel process for the preparation of 8β-methyl-$\Delta^1$-cortisone and its esters.

It is a further object of the invention to provide novel intermediates for 8β-methyl-$\Delta^1$-cortisone and its esters.

These and other objects and advantages will become obvious from the following detailed description.

The novel products of the invention have the formula

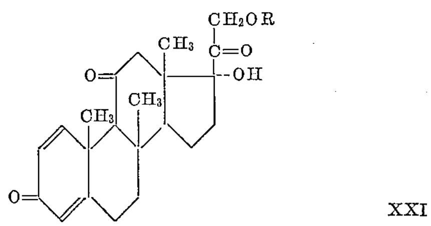

wherein R is selected from the group consisting of hydrodrogen and an acyl radical of an organic carboxylic acid having 1 to 18 carbon atoms.

The acyl radical of the organic carboxylic acid having 1 to 18 carbon atoms may be derived from an aliphatic,

2 aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids such as furane - 2 - carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

The process of the invention comprises reacting 20β-aroyloxy-$\Delta^4$-pregnene-3,11-dione wherein the aroyloxy group is derived from a monocyclic aryl carboxylic acid with an acylating agent of a lower aliphatic acid to form 3-acyloxy-20β-aroyloxy-$\Delta^{3,5}$-pregnadiene-11-one, simultaneously reducing and saponifying the latter to form 20β-aroyloxy-$\Delta^5$-pregnene-3β-ol-11-one, esterifying the latter with a lower aliphatic acid acylating agent to form 3β-acyloxy-20β-aroyloxy-$\Delta^5$-pregnene-11-one, oxidizing the latter to form 3β-acyloxy-20β-aroyloxy-$\Delta^5$-pregnene-7,11-dione, catalytically hydrogenating the latter in the presence of a palladium catalyst to form 3β-acyloxy-20β-aroyloxy-5α-pregnane-7,11-dione, hydrolyzing the latter to form 20β-arolyloxy-5α-pregnane-3β-ol-7,11-dione, reacting the latter with an alkylene glycol to form 7-alkylene-dioxy-20β-aroyloxy-5α-pregnane-3β-ol-11-one, reducing the latter to form 7-alkylene-dioxy-20β-aroyloxy-5α-pregnane-3β,11β-diol, esterifying the latter with a monocyclic aryl carboxylic acylating agent to form 3β,20β-diaroyloxy-7-alkylene-dioxy-5α-pregnane-11β-ol, dehydrating the latter in the presence of a sulfonyl halide to form 3β,20β-diaroyloxy-7-alkylene-dioxy-$\Delta^{9(11)}$ - 5α - pregnene, hydrolyzing the latter to form 3β,20β-diaroyloxy-$\Delta^{9(11)}$-5α-pregnene-7-one, reacting the latter with a methylating agent to form 3β,20β - diaroyloxy - 8β - methyl-$\Delta^{9(11)}$-5α-pregnene-7-one, saponifying the latter to form 8β-methyl-$\Delta^{9(11)}$-5α-pregnene-3β,20β-diol-7-one, reducing the latter with anhydrous hydrazine to form 8β-methyl-$\Delta^{9(11)}$-5α-pregnene-3β,20β-diol, reacting the latter with first diborane at room temperature for 15 to 20 minutes and then hydrogen peroxide to form 8β-methyl-5α-pregnane-3β,11α,20β-triol, oxidizing the latter to form 8β-methyl-5α - pregnane - 3,11,20 - trione, reacting the latter with a lower alkylene glycol to form the 3-alkylene-dioxy-8β-methyl-5α-pregnane-11,20-dione, oxidizing the latter to form the 3 - alkylene-dioxy-17α-hydroperoxy-8β-methyl-5α-pregnane-11,20-dione, simultaneously reducing and hydrolyzing the latter to form 8β-methyl-5α-pregnane-17α-ol-3,11,20-trione, brominating and dehydrobrominating the latter to form 8β-methyl-$\Delta^{1,4}$-pregnadiene-17α-ol-3, 11,20-trione, reacting the latter with iodine to form 8β-methyl-21-diiodo-$\Delta^{1,4}$-pregnadiene - 17α - ol - 3,11,20 - trione, reacting the latter with an alkali metal acetate to form 8β-methyl-21-acetoxy1$\Delta^{1,4}$-pregnadiene-17α-ol-3,11,20-trione, saponifying the latter to form 8β-methyl-$\Delta^{1}$-cortisone, which may be esterified with an acylating agent such as an acid anhydride or acid chloride.

A preferred mode of the process of the invention comprises reacting 20β - benzoyloxy-$\Delta^{4}$-pregnene-3,11-dione with an acetylating agent to form 3-acetoxy-20β-benzoyloxy-$\Delta^{3,5}$-pregnadiene-11-one, simultaneously reducing and saponifying the latter with an alkali metal borohydride to form 20β-benzoyloxy-$\Delta^{5}$-pregnene-3β-ol-11-one, esterifying the latter with an acetylating agent to form 3β-acetoxy-20β-benzoyloxy-$\Delta^{5}$-pregnene - 11 - one, oxidizing the latter with a chromic acid ester to form 3β-acetoxy-20β-benzoyloxy-$\Delta^{5}$-pregnene-7,11-dione, catalytically hydrogenating the latter in the presence of a palladium catalyst to form 3β-acetoxy-20β-benzoyloxy-5α-pregnane-7,11-dione, hydrolyzing the latter in the presence of p-toluene sulfonic acid ester to form 20β-benzoyloxy-5α-pregnane-3β-ol-7,11-dione, reacting the latter with ethylene glycol to form 7-ethylenedioxy-20β-benzoyloxy-5α-pregnane-3β-ol-11-one, reducing the latter with an alkali metal borohydride such as potassium borohydride to form 7-ethylenedioxy-20β-benzoyloxy-5α-pregnane-3β,11β-diol, esterifying the latter with a benzoyl halide such as benzoyl chloride to form 3β,20β-dibenzoyloxy-7-ethylenedioxy-5α-pregnane-11β-ol, dehydrating the latter with methane sulfonyl chloride in the presence of a base to form 3β,20β-dibenzoyloxy-7-ethylenedioxy-$\Delta^{9(11)}$-5α-pregnene, hydrolyzing the latter under acidic conditions to form 3β,20β-dibenzoyloxy-$\Delta^{9(11)}$-5α-pregnene-7-one, reacting the latter with methyl iodide in the presence of an alkali metal alcoholate to form 3β,20β-dibenzoyloxy-8β-methyl-$\Delta^{9(11)}$-5α-pregnene-7-one, saponifying the latter in the presence of an alkali metal alcoholate to form 8β-methyl-$\Delta^{9(11)}$-5α-pregnene-3β,20β-diol-7-one, reducing the latter with anhydrous hydrazine in the presence of an alkali metal diethylene glycolate to form 8β-methyl-$\Delta^{9(11)}$-5α-pregnene-3β,20β-diol, reacting the latter with first diborane in ether at 20° C. for 15 to 20 minutes and then hydrogen peroxide in the presence of an alkali metal alkanolate to form 8β-methyl-5α-pregnane-3β,11α,20β-triol, oxidizing the latter with chromium trioxide in sulfuric acid to form 8β-methyl-5α-pregnane-3,11,20-trione, reacting the latter with ethylene glycol to form 3-ethylenedioxy-8β-methyl-5α-pregnane-11,20-dione, oxidizing the latter with oxygen in the presence of an alkali metal tertiary alcoholate such as potassium tertiary butylate to form 3-ethylenedioxy-17α - hydroperoxy - 8β - methyl-5α-pregnane-11,20-dione, simultaneously reducing and hydrolyzing the latter with zinc and acetic acid to form 8β-methyl-5α-pregnane-17α-ol-3,11,20-trione, brominating the latter with bromine in acetic acid to form the 2,4-dibromo product and dehydrobrominating the said product with a mixture of lithium bromide and lithium carbonate in dimethylformamide to form 8β-methyl - $\Delta^{1,4}$ - pregnadiene-17α-ol-3,11,20-trione, reacting the latter with iodine in the presence of calcium oxide and calcium chloride to form 8β-methyl-21-diiodo-$\Delta^{1,4}$-pregnadiene-17α-ol-3,11,20-trione, reacting the latter with potassium acetate to form 8β-methyl-21-acetoxy-$\Delta^{1,4}$-pregnadiene-17α-ol-3,11,20-trione, saponifying the latter under alkaline conditions to form 8β-methyl-$\Delta^{1}$-cortisone and recovering the latter. The reaction scheme is illustrated in Table I.

TABLE 1

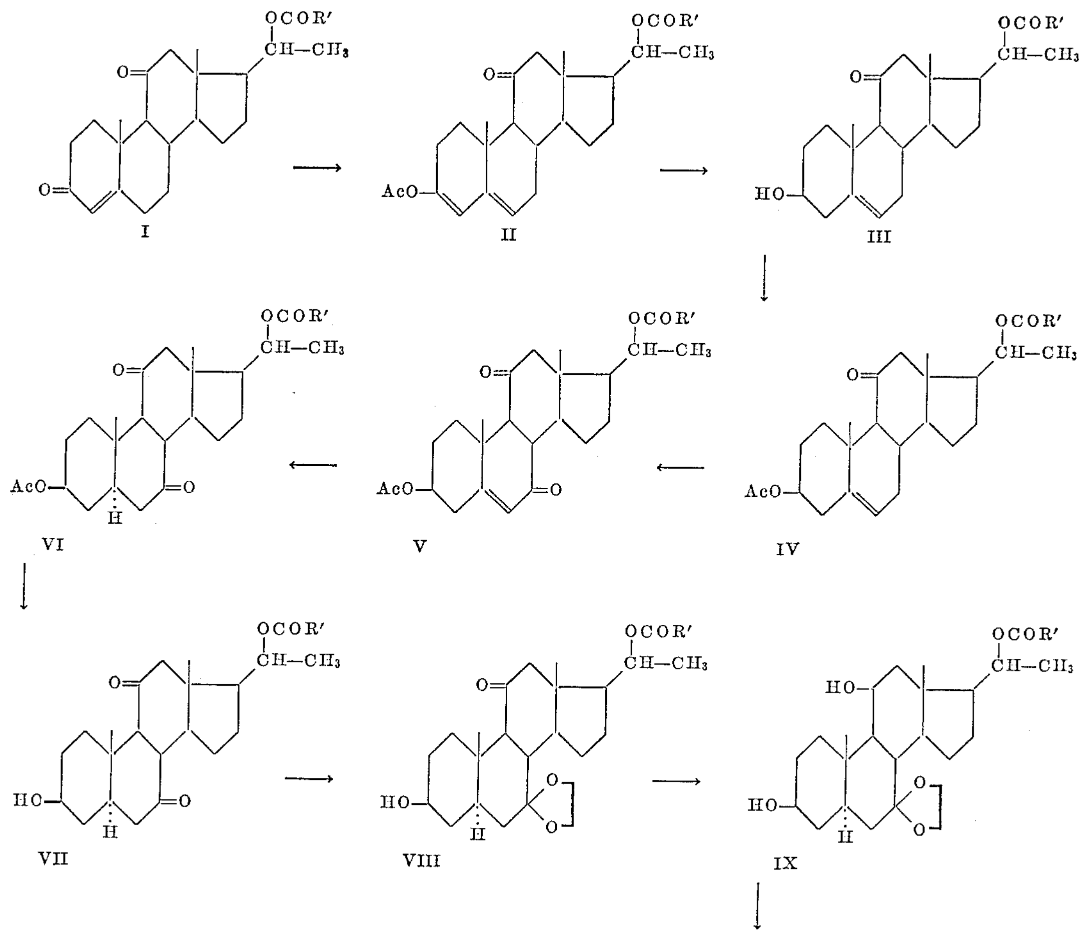

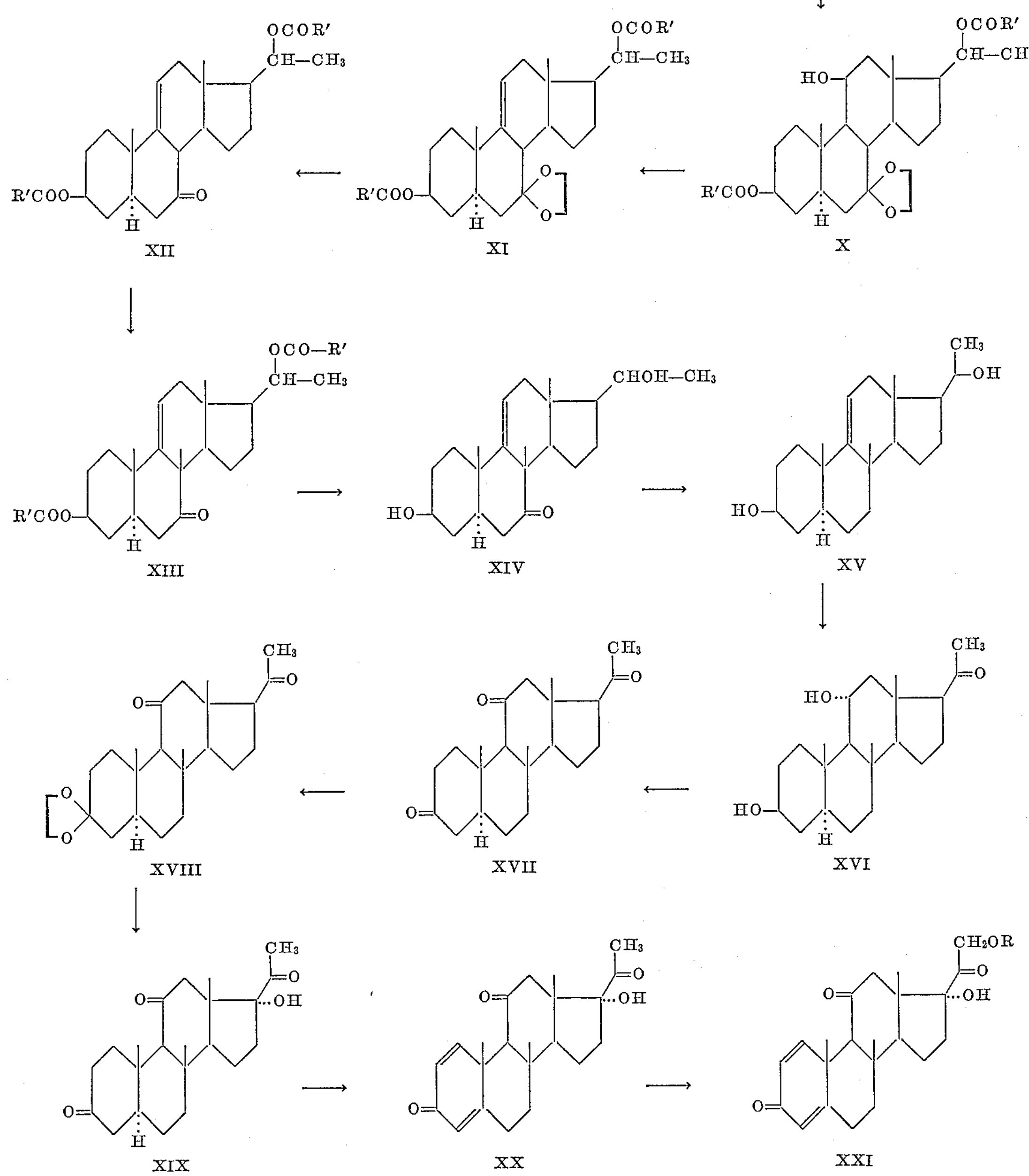

wherein R is selected from the group consisting of hydrogen and an acyl radical of an organic carboxylic acid having 1 to 18 carbon atoms, R' is a monocyclic aryl radical and Ac is the acyl radical of a lower aliphatic acid.

It is important that the reaction of 8β-methyl-$\Delta^{9(11)}$-5α-pregnene-3β,20β-diol with diborane be conducted at temperatures of about 20° C. for a short period of time of about 15 to 20 minutes to prevent the formation of 8β-methyl-5α-pregnane-11β-ol-3,20-dione during the subsequent oxidation step which can not be used in the present synthesis.

The novel intermediate, 8β-methyl-$\Delta^{9(11)}$-5α-pregnene-3β,20β-diol-7-one, is also useful in the preparation of other 8β-methylated steroids of the androstane, pregnane and spirostane series.

In the following example there are described several preferred embodiments to illustrate the invention. However, it should be understood that the invention is not intended to be limited to the specific embodiments.

EXAMPLE

*Step A.—Preparation of 3-Acetoxy-20β-Benzoyloxy-$\Delta^{3,5}$-Pregnadiene-11-One (II)*

465 g. of 20β-benzoyloxy-$\Delta^4$-pregnene-3,11-dione, 1820 cc. of acetic acid anhydride, and 1820 cc. of acetyl chloride were successively introduced into a multi-neck balloon flask. The reaction mixture was heated for 3 hours at reflux under an atmosphere of nitrogen. The excess reactant was removed by distillation under vacuum. The slightly colored residual mass was taken up with 930 cc. of ether at reflux temperature and the solution was iced for a period of 15 minutes at 0° C. The enolic acetate precipitate was recovered, vacuum filtered, then washed with a mixture of ether and petroleum ether. The product was allowed to dry overnight. 414 g. of 3-acetoxy-20β-benzoyloxy-$\Delta^{3,5}$-pregnadiene-11-one were thus obtained, being a yield of 90% with reference to the theoretical.

This compound is not described in the literature.

The 3-acetoxy-20β-benzoyloxy-$\Delta^{3,5}$-pregnadiene-11-one occurred in the form of colorless prisms. It was very soluble in chloroform, slightly soluble in alcohol and ether, insoluble in water and dilute aqueous acids. It was decomposed in alkaline solutions. It possessed the following physical constants: Melting point 162° C., specific rotation $[\alpha]_D^{20}=-137° \pm 2°$ (c.=1% in chloroform).

*Analysis.*—$C_{30}H_{36}O_5$; molecular weight=476.59. Calculated: C, 75.60%; H, 7.61%. Found: C, 75.3%; H, 7.6%.

The starting compound 20β-benzoyloxy-$\Delta^4$-pregnene-3,11-dione was obtained according to the process described by Constantin et al., J. Am. Chem. Soc., 75, 1716 (1953).

*Step B.—Preparation of 20β-Benzoyloxy-$\Delta^5$-Pregnene-3β-Ol-11-One (III)*

320 g. of 3-acetoxy-20β-benzoyloxy-$\Delta^{3,5}$-pregnadiene-11-one, II, obtained according to the preceding step, were dissolved in 2560 cc. of tetrahydrofuran in a balloon flask having three necks. The 640 cc. of methanol and 320 cc. of water were added. The solution was cooled to 0 to +5° C. Then 64 g. of sodium borohydride were added and after 15 minutes 760 cc. of 1 N sodium hydroxide solution were added. The reaction mixture remained under agitation for a period of 3 hours at this temperature. The mixture was neutralized by the addition of 33% acetic acid while avoiding exceeding 10° C. The mixture was then diluted with 3200 cc. of water and 20β-benzoyloxy-$\Delta^5$-pregnene-3β-ol-11-one precipitated in a crystalline form. The suspension was agitated for a period of 30 minutes and then the product was separated by filtration, vacuum filtered, washed 4 times by trituration with hot water and finally dried overnight. 256 g. of 20β-benzoyloxy-$\Delta^5$-pregnene-3β-ol-11-one were thus obtained, being a yield of 87% of the theoretical.

This compound, which is not described in the literature, occurred in the form of elongated colorless prisms, soluble in methylene chloride and chloroform, slightly soluble in alcohol, insoluble in ether, water and aqueous media. It has the following physical constants: Melting point 240° C., specific rotation $[\alpha]_D^{20}=-106° \pm 2°$ (c.=1% in chloroform).

*Analysis.*—$C_{28}H_{36}O_4$; molecular weight=436.57. Calculated: C, 77.03%; H, 8.31%. Found: C, 77.02%; H, 8.31%.

*Step C.—Preparation of 3β-Acetoxy-20β-Benzoyloxy-$\Delta^5$-Pregnene-11-One (IV)*

240 g. of 20β-benzoyloxy-$\Delta^5$-pregnene-3β-ol-11-one (III) as obtained in the preceding step, were dissolved under mechanical agitation at 70° C. in 720 cc. of pyridine and 480 cc. of acetic acid anhydride. The reaction mixture was maintained under agitation and under an atmosphere of nitrogen for a period of 16 hours at room temperature. The excess of reactant was hydrolyzed by the addition of 1500 cc. of water while maintaining the internal temperature of the reaction mixture below 80° C. The temperature of the mixture was lowered to 45° C. and the agitation of the crystalline suspension thus formed was continued for a period of 45 minutes. The mixture was cooled to 25° C. and the precipitate separated, vacuum filtered, washed several times with aqueous methanol containing different concentrations and dried. 260 g. of 3β-acetoxy-20β-benzoyloxy-$\Delta^5$-pregnene-11-one were thus obtained which was sufficiently pure for use as such in the following step of the synthesis. The yield is 99% of the theoretical.

By recrystallization from a mixture of methylene chloride and ethanol, the 3β-acetoxy-20β-benzoyloxy-$\Delta^5$-pregnene-11-one was obtained in the form of colorless primatic crystals, very soluble in chloroform, slightly soluble in alcohol and ether and insoluble in water. This compound is not described in the literature. It had the following constants: Melting point 164° C., specific rotation $[\alpha]_D^{20}=-92° \pm 2°$ (c.=1% in chloroform).

*Analysis.*—$C_{30}H_{38}O_5$; molecular weight=478.60. Calculated: C, 75.28%; H, 8.00%. Found: C, 75.1%; H, 8.2%.

*Step D.—Preparation of 3β-Acetoxy-20β-Benzoyloxy-$\Delta^5$-Pregnene-7,11-Dione (V)*

264 g. of 3β-acetoxy-20β-benzoyloxy-$\Delta^5$-pregnene-11-one (IV) obtained in the preceding step were dissolved in 2640 cc. of carbon tetrachloride in a balloon flask having three necks. This solution was raised to 60° C. By a brominating tube over a period of 15 minutes, the following mixture was added:

| | cc. |
|---|---|
| A tertiary butyl chromate solution in carbon tetrachloride testing 18.5 g. of chromic acid anhydride per hundred | 2640 |
| Acetic acid anhydride | 880 |
| Acetic acid | 440 |

After this addition the reaction mixture was raised to 65° to 70° C. and maintained at this temperature under agitation for a period of 16 hours. At the end of this time, the mixture was cooled to 20° C. The chrome salts were separated by filtration and the filter cake was rinsed with carbon tetrachloride. The carbon tetrachloride solutions were combined. The excess of tertiary butyl chromate was destroyed by careful addition over a course of one hour of a mixture of 2640 cc. of an aqueous 20% oxalic acid solution and 660 cc. of methanol, while maintaining a temperature of between 25° and 30° C. The agitation was continued for a period of about 15 minutes and then the organic phase was separated by decantation. The aqueous phase was extracted again with carbon tetrachloride four times. The combined organic phases had added thereto 200 cc. of methanol and 100 cc. of acetic acid in order to finish the destruction of the tertiary butyl chromate. The mixture was allowed to stand 15 minutes and then the carbon tetrachloride solution was washed twice with a 20% oxalic acid solution, then with water. The separated organic solution was dried over magnesium sulfate, filtered and brought to dryness under vacuum. The product crystallized during the course of the concentration. The residue was taken up with 260 cc. of alcohol. The solution was iced rapidly and the precipitate formed was separated. It was vacuum filtered, washed with a mixture of alcohol and petroleum ether of different concentrations and dried.

208 g. of raw 3β-acetoxy-20β-benzoyloxy-$\Delta^5$-pregnene-7,11-dione were thus obtained. By recrystallization from a mixture of methylene chloride and alcohol, 179 g. of pure product were obtained, crystallized in colorless prisms, very soluble in chloroform, slightly soluble in alcohol and ether and insoluble in water.

This compound is not described in the literature.

It had the following constants: Slow melting point starting at 120° C.; specific rotation $[\alpha]_D^{20}=-134° \pm 2°$ (c.=1% in chloroform).

*Analysis.*—$C_{30}H_{36}O_6$; molecular weight=492.59. Calculated: C, 73.14%; H, 7.37%. Found: C, 73.3%; H, 7.5%.

*Step E.—Preparation of 3β-Acetoxy-20β-Benzoyloxy-5α-Pregnane-7,11-Dione (VI)*

*Preparation of catalyst.*—The catalyst was prepared by hydrogenation at reflux of an aqueous suspension of 54 g. of carbon, 138 cc. of a 2% solution of palladium chloride, and 1000 cc. of water. The catalyst was separated by filtration, vacuum filtered and washed with water and alcohol.

*Hydrogenation.*—175 g. of 3β-acetoxy-20β-benzoyloxy-$\Delta^5$-pregnene-7,11-dione (V) obtained according to the preceding step were dissolved in 1750 cc. of tetrahydrofuran to which the previously prepared catalyst was added. The mixture was subjected to hydrogenation for a period of 2 hours and 45 minutes. The catalyst was separated by vacuum filtration and washed several times with tetrahydrofuran. The tetrahydrofuran wash liquor was combined with the solution and the solutions were concentrated to obtain a syrup which was redissolved in 350 cc. of ethanol. The solution crystallized rapidly. The 3β-acetoxy-20β-benzoyloxy-5α-pregnane-7,11-dione (VI) was separated by filtration, vacuum filtered, and washed twice with a mixture of alcohol and petroleum ether. 142 g. of the product were obtained, being a yield of 81%.

By recrystallization in a mixture of methylene chloride and alcohol, the pure product was isolated with a yield of 95%. The product occurred as colorless prismatic crystals, very soluble in chloroform and methylene chloride, slightly soluble in alcohol and ether, insoluble in water.

This compound is not described in the literature. It had a melting point of about 130° C. (pasty fusion); specific rotation $[\alpha]_D^{20}=-60° \pm 1°$ (c.=1% in chloroform).

*Analysis.*—$C_{30}H_{38}O_6$; molecular weight=494.60. Calculated: C, 72.85%; H, 7.74%. Found: C, 73.0%; H, 7.9%.

*Step F.—Preparation of 20β-Benzoyloxy-5α-Pregnane-3β-Ol-7,11-Dione (VII)*

A mixture of 134 g. of 3β-acetoxy-20β-benzoyloxy-5α-pregnane-7,11-dione (VI) obtained according to the preceding step, 1340 cc. of methanol and 13.4 g. of p-toluene sulfonic acid was heated to reflux under nitrogen for a peirod of 3 hours. The solution thus obtained was concentrated next under vacuum to a volume of about 300 cc. Then after an addition of 134 cc. of hot water, 20β-benzoyloxy-5α-pregnane-3β-ol-7,11-dione crystallized. Another 50 cc. of solvent were removed and the crystalline suspension was iced. The precipitate was separated, vacuum filtered, washed twice with 50% alcohol, then three times with alcohol at 10°. The product was purified by trituration with ether and then dried. 104 g. of 20β-benzoyloxy-5α-pregnane-3β-ol-7,11-dione were obtained, being a yield of 85% of the theoretical.

This compound is not described in the literaure. It occurred in the form of colorless prisms, very soluble in chloroform, slightly soluble in alcohol and ether, insoluble in water. By recrystallization from a mixture of methylene chloride and ether, an analytical sample was obtained having the following constants: Metling point 254° C., specific rotation $[\alpha]_D^{20}=-80° \pm 2°$ (c.=1% in chloroform).

*Analysis.*—$C_{28}H_{36}O_5$; molecular weight=452.57. Calculated: C, 74.3%; H, 8.02%. Found: C, 74.3%; H, 8.2%.

*Step G.—Preparation of 7-Ethylenedioxy-20β-Benzoyloxy-5α-Pregnane-3β-Ol-11-One (VIII)*

92 g. of 20β-benzoyloxy-5α-pregnane-3β-ol-7,11-dione (VII) were dissolved in 460 cc. of chloroform. 1380 cc. of ethylene glycol were added to this solution and the mixture was heated to reflux. 200 cc. of chloroform were distilled therefrom over a period of 15 minutes. Then 4.6 g. of p-toluene sulfonic acid monohydrate were added to the mixture and the mixture was heated at reflux for a period of 2 hours in an atmosphere of nitrogen. The water formed in the course of the reaction was entrained azeotropically. At the end of 2 hours the temperature of the reaction mixture was brought from 105° C. to 70° C. and 20 g. of sodium bicarbonate were introduced slowly. While agitating, the product crystallized and solidified. This mass was disintegrated by addition of 400 cc. of a 10% solution of sodium bicarbonate, then 1000 cc. of water. The mixture was cooled to about 15° C., filtered and the precipitate vacuum filtered. It was washed three times with water and then redissolved in 270 cc. of methylene chloride. The methylene chloride solution was washed with water, dried over magnesium sulfate, filtered and concentrated to half its volume. Then 460 cc. of petroleum ether were added. The 7-ethylenedioxy-20β-benzoyloxy-5α-pregnane-3β-ol-11-one precipitated immediately in a crystalline form. The mixture was cooled to 15° C., filtered, and then the crystalline mass vacuum filtered, washed twice with a mixture of ether and petroleum ether. 92 g. of the product were thus obtained, being a yield of 91%.

The 7-ethylenedioxy-20β-benzoyloxy-5α-pregnane-3β-ol-11-one is not described in the literature. It occurred in the form of colorless, long needles, soluble in acetone, benzene and chloroform, slightly soluble in alcohol and ether, insoluble in ether and petroleum ether. It possessed the following constants: Melting point of 216° C., specific rotation $[\alpha]_D^{20}=-40° \pm 1°$ (c.=1% in chloroform).

*Analysis.*—$C_{30}H_{40}O_6$; molecular weight=496.62. Calculated: C, 72.55%; H, 8.12%. Found: C, 72.4%; H, 7.9%.

*Step H.—Preparation of 7-Ethylenedioxy-20β-Benzoyloxy-5α-Pregnane-3β,11β-Diol (IX)*

Into a receptacle having a ground glass neck, there were introduced successively 3 g. of 7-ethylenedioxy-20β-benzoyloxy-5α-pregnane-3β-ol-11-one (VIII) prepared according to the preceding step, 500 mg. of potassium borohydride and 45 cc. of tetrahydrofuran. The mixture was agitated with the aid of a magnetic agitator until completely dissolved. 15 cc. of methanol, 9 cc. of water and finally 2.5 g. of potassium borohydride were added. The mixture was heated to reflux under agitation for a period of 3 hours, then allowed to cool to 40° C. Then slowly 180 cc. of water were introduced. The excess potassium borohydride dissolved and the 7-ethylenedioxy-20β-benzoyloxy-5α-pregnane-3β,11β-diol precipitated in crystalline form. The suspension was iced for a period of 15 minutes while maintaining agitation. The precipitate was separated by filtration. It was washed with water until the wash waters were neutral and then dried.

2.85 g. of the product were thus obtained, being a yield of 95% of the theoretical.

7-ethylenedioxy-20β-benzoyloxy-5α-pregnane-3β,11β-diol is not described in the literature. It occurred in the form of massive, quadratic prisms, soluble in methylene chloride and chloroform, slightly soluble in alcohol, insoluble in ether. Its melting point was 277° C. and the specific rotation $[\alpha]_D^{20}=-20°$ (c.=1% in chloroform).

*Analysis.*—$C_{30}H_{42}O_6$; molecular weight=498.64. Calculated: C, 72.26%; H, 8.49%; O, 19.25%. Found C, 72.00%; H, 8.50%; O, 19.03%.

*Step I.—Preparation of 3β,20β-Dibenzoyloxy-7-Ethylenedioxy-5α-Pregnane-11β-Ol (X)*

2 g. of 7-ethylenedioxy-20β-benzoyloxy-5α-pregnane-3β,11β-diol (IX), prepared according to the preceding stage, were dissolved by agitation in 10 cc. of pyridine in a conical flask. Then 2 cc. of benzoyl chloride were introduced. The flask was sealed hermetically and agitated for a period of two hours at a temperature between 25 and 30° C. 100 cc. of water were then added slowly. A crystalline precipitate appeared which was isolated by filtration, vacuum filtered, washed with water, then redissolved in 10 cc. of methylene chloride. The methylene chloride solution was washed with 30 cc. of bicarbonated water, dried over magnesium sulfate and then decolorized by agitation with adsorbent carbon black. The solution was filtered, then distilled to a small volume and 40 cc. of hot petroleum ether were added. 3β,20β-dibenzoyloxy-7-ethylenedioxy-5α-pregnane-11β-ol crystallized rapidly. The mixture was cooled on an ice bath, filtered, and the precipitate was vacuum filtered and washed with petroleum ether and then dried.

2.22 g. of 3β,20β-dibenzoyloxy-7-ethylenedioxy-5α-pregnane-11β-ol (X) were thus obtained being a yield of 92%. For analysis the dibenzoate was recrystallized from a mixture of methylene chloride and petroleum ether.

The $3\beta,20\beta$ - dibenzoyloxy - 7 - ethylenedioxy - $5\alpha$-pregnane-$11\beta$-ol is not described in the literature. It occurred in two colorless crystalline forms. It was soluble in chloroform and acetone, slightly soluble in alcohol, insoluble in ether and petroleum ether. The crystalline form of prismatic needles melted at 266° C. The crystalline form of needles melted at 230° C., then about 260° C., specific rotation $[\alpha]_D^{20}=-5°$ (c.=1% in chloroform).

*Analysis.*—$C_{37}H_{46}O_7$; molecular weight=602.74. Calculated: C, 73.72%; H, 7.69%. Found: C, 73.7%; H, 7.6%.

*Step J.—Preparation of $3\beta,20\beta$-Dibenzoyloxy-7-Ethylenedioxy-$\Delta^{9(11)}$-$5\alpha$-Pregnene (XI)*

2.85 g. of $3\beta,20\beta$-dibenzoyloxy-7-ethylenedioxy-$5\alpha$-pregnane-$11\beta$-ol were placed in suspension in a conical flask with 28 cc. of dimethylformamide and 3.42 cc. of pyridine. To the suspension maintained under agitation were added 1.42 cc. of methane sulfonyl chloride. Then the suspension was heated to 50° C. and hermetically sealed. The agitation was maintained for a period of 5 hours at room temperature. The reaction mixture was poured into a mixture of 300 cc. of ice water and 1 g. of sodium bicarbonate. The precipitate was separated, vacuum filtered, and washed three times with water. The still humid crystals were redissolved in 30 cc. of methylene chloride and the methylene chloride solution was washed with bicarbonated water, dried over magnesium sulfate, filtered, decolorized by the addition of adsorbent carbon black and filtered again. Then 6 drops of pyridine were added and the mixture was distilled to a small volume. To this concentrated solution, 60 cc. of petroleum ether were added and the temperature raised to 40° C. A clear solution was obtained which crystallized spontaneously into needles. It was iced and the precipitate was separated by filtration, vacuum filtered, washed with petroleum ether and dried. 2.6 g. of $3\beta,20\beta$-dibenzoyloxy - 7 - ethylenedioxy - $\Delta^{9(11)}$ - $5\alpha$ - pregnene, being a yield of 94% of the theoretical, were obtained.

This compound is not described in the literature. It can be recrystallized in a mixture of methylene chloride and ether or in ether. A product was thus obtained crystallized in colorless, long needles, soluble in chloroform and acetone, slightly soluble in ether and alcohol. It had a melting point of 180° C., then 210° C., and a specific rotation $[\alpha]_D^{20}=-32° \pm 2°$ (c=0.5% in chloroform).

*Analysis.*—$C_{37}H_{44}O_6$; molecular weight=584.72. Calculated: C, 76.00%; H, 7.59%. Found: C, 75.8%; H, 7.8%.

*Step K.—Preparation of $3\beta,20\beta$-Dibenzoyloxy-$\Delta^{9(11)}$-$5\alpha$-Pregnene-7-One (XII)*

1 g. of $3\beta,20\beta$-dibenzoyloxy-7-ethylenedioxy-$\Delta^{9(11)}$-$5\alpha$-pregnene (XI) prepared according to the preceding step, 20 cc. of acetic acid and 5 cc. of water were introduced into a conical flask. The suspension obtained was heated to 90° C. A rapid solution was noted, then a solidification en masse by abundant crystallization. The mixture was maintained at 90° C. for a period of 15 minutes while agitating. It was cooled to 10° C. and the precipitate was separated and vacuum filtered. The raw product was washed with water, then redissolved in a sufficient amount of methylene chloride. The methylene chloride solution was washed with a solution of sodium bicarbonate, dried over magnesium sulfate, then filtered. Thereafter, the solution was distilled to a syrupy consistency and 3 cc. of ether were added. The $3\beta,20\beta$-dibenzoyloxy-$\Delta^{9(11)}$-$5\alpha$-pregnene-7-one crystallized in the form of prismatic needles. The precipitate was iced, vacuum filtered, washed with ether and dried. 850 mg. were recovered, being a yield of 91.5% of the theoretical, of $3\beta,20\beta$-dibenzoyloxy-$\Delta^{9(11)}$-$5\alpha$-pregnene-7-one (XII).

This compound, which is novel, occurred in the form of prismatic needles soluble in chloroform and acetone, slightly soluble in alcohol and insoluble in water and ether. It had a melting point of 250° C. and a specific rotation $[\alpha]_D^{20}=-58°$ (c.=1% in chloroform). UV spectra (ethanol):

| | | | |
|---|---|---|---|
| λ max | 230 mμ | 273 mμ | 281 mμ |
| $E_{1\,cm}^{1\%}$ | 507 | 35.3 | 28.9 |

The UV spectra indicates the adsence of the conjugated $\Delta^{8(9)}$-7-ketone whose adsorption occurs at 253 mμ (Heusser et al., Helv. 34, 2106 (1951)).

*Analysis.*—$C_{35}H_{40}O_5$; molecular weight=540.67. Calculated: C, 77.75%; H, 7.46%. Found: C, 77.6%; H, 7.5%.

*Step L.—Preparation of $3\beta,20\beta$-Dibenzoyloxy-$8\beta$-Methyl-$\Delta^{9(11)}$-$5\alpha$-Pregnene-7-One (XIII)*

900 mg. of $3\beta,20\beta$-dibenzoyloxy-$\Delta^{9(11)}$-$5\alpha$-pregnene-7-one (XII) were dissolved in 21 cc. of methyl iodide in a three-necked balloon flask. The solution was cooled to 10° C. and then over a period of 5 minutes 63 cc. of a normal solution of potassium tertiary butylate in tertiary butanol were introduced. The reaction mixture was agitated for a period of 20 minutes, and then poured into 600 cc. of water. The aqueous phase was extracted with ether. The ethereal solutions were combined, washed with water, dried over magnesium sulfate, filtered, decolorized with adsorbant carbon black, filtered again and brought to dryness. 850 mg. of raw $3\beta,20\beta$-dibenzoyloxy-$8\beta$-methyl-$\Delta^{9(11)}$-$5\alpha$-pregnene-7-one were thus obtained which were redissolved in ether. The product recrystallized rapidly and the precipitate was separated, vacuum filtered and washed with ether.

A first yield of 178 mg. of $3\beta,20\beta$-dibenzoyloxy-$8\beta$-methyl-$\Delta^{9(11)}$-$5\alpha$-pregnene-7-one (XIII) was thus obtained which compound crystallized in colorless prisms melting at about 204° C. A second recrystallization from a mixture of methylene chloride and ethanol gave 117 mg. of a pure product for analysis melting at 214° C.

$3\beta,20\beta$ - dibenzoyloxy-$8\beta$-methyl-$\Delta^{9(11)}$-$5\alpha$-pregnene-7-one is not described in the literature. It occurred in the form of colorless elongated prisms, soluble in acetone and chloroform, slightly soluble in alcohol, insoluble in ether and in water. It had a melting point of 214° C. and a specific rotation $[\alpha]_D^{20}=+7° \pm 1°$ (c.=1% in chloroform. UV spectra (ethanol-methylene chloride):

| | | | |
|---|---|---|---|
| λ max | 229–230 mμ | 273 mμ | 281 mμ |
| $E_{1\,cm}^{1\%}$ | 533 | 37.7 | 29.6 |

absence of the 7-oxo-$\Delta^{8(9)}$ group.

*Nuclear magnetic resonance curve.*—The product conforms to the indicated structure showing the presence of four methyl groups of which two methyl groups are angular at 33.4 and 60.6 Hz.; one methyl group in the 21-position gives a doublet at 71.3 and 77.6 Hz., and one methyl group at 89.6 Hz. corresponding to the 8-position.

*Step M.—Preparation of $8\beta$-Methyl-$\Delta^{9(11)}$-$5\alpha$-Pregnene-$3\beta,20\beta$-Diol-7-One (XIV)*

A mixture of 100 mg. of $3\beta,20\beta$-dibenzoyloxy-$8\beta$-methyl-$\Delta^{9(11)}$-$5\alpha$-pregnene-7-one (XIII), prepared according to the preceding step, in 1 cc. of methanol, 1.2 cc. of a normal solution of sodium methylate in methanol and 3 cc. of ethylene glycol was heated to reflux under an atmosphere of nitrogen. The mixture was heated over a period of 15 minutes from 80° C. to 100° C., then from 100° C. to 130° C. over a period of 15 minutes. A complete solution was obtained. 10 drops of water were added and then the solution was cooled. $8\beta$-methyl-$\Delta^{9(11)}$-$5\alpha$-pregnene-$3\beta,20\beta$-diol-7-one crystallized and the crystals were separated by filtration, vacuum filtered and washed with water. The crystals were taken up with 2 cc. of methylene chloride and 1 drop of alcohol. The solution was washed with bicarbonated water, dried, distilled to a small volume and ether added. 8β-methyl-$\Delta^{9(11)}$-5α-pregnene-3β,20β-diol-7-one crystallized. 46 mg. were obtained being a yield of 73%. This product is not described in the literature. It occurred in the form of white prisms, soluble in acetone and chloroform, slightly soluble in alcohol, insoluble in ether. It had a melting point of 210° C. It had no UV adsorption at 253–254 mμ and thus had no 7-ketone-$\Delta^{8(9)}$-ethylenic groups.

This confirms the attachment of the methyl group in the 8-position. This methyl group renders impossible the shifting of the double bond from 9(11)-position into 8(9)-position which occurs easily under the same conditions before methylation.

*Step N.—8β - Methyl-$\Delta^{9(11)}$-5α-Pregnene-3β,20β - Diol (XV)*

2 g. of scraped sodium were dissolved in 100 cc. of diethylene glycol heated to 60° C. Then anhydrous hydrazine was passed in by distillation of hydrazine hydrate over sodium hydroxide solution until a reflux temperature of 185° C. was obtained. The solution was cooled to 50° C. and 10.3 g. of 8β-methyl-$\Delta^{9(11)}$-5α-pregnene-3β,20β-diol-7-one (XIV) obtained according to the preceding step were introduced. The mixture was heated while slowly distilling hydrazine. After 2 hours of distillation between 185 and 200° C., the reaction mixture was allowed to reflux at 200° C. overnight and the next day the remainder of the hydrazine was distilled therefrom. The mixture was cooled to 130° C. 200 cc. of water were added very slowly. The solution was iced and the precipitated product was vacuum filtered. It was washed with water, dried and 9.6 g. of 8β-methyl-$\Delta^{9(11)}$-5α-pregnene-3β,20β-diol (XV) were obtained, having a melting point of 190° C. and a specific rotation $[\alpha]_D^{20}=+94°$ (c.=1% in chloroform).

For analysis the product was recrystallized from a mixture of methylene chloride and alcohol (1:1) without having the constants changed. The product occurred in the form of white crystals, slightly soluble in alcohol, insoluble in ether.

*Analysis.*—$C_{22}H_{36}O_2$; molecular weight=332.51. Calculated: C, 79.46%; H, 10.92%. Found: C, 79.3%; H, 10.7%.

This compound is not described in the literature.

*Step O.—8β - Methyl - 5α - Pregnane - 3β,11α,20β-Triol (XVI)*

7.2 g. of 8β - methyl-$\Delta^{9(11)}$-5α-pregnene-3β,20β-diol (XV) prepared according to the preceding step were placed in suspension in 360 cc. of anhydrous ether. 15 cc. of an ethereal solution containing 45% boron fluoride were added and then 3.6 g. of lithium aluminum hydride in 150 cc. of anhydrous ether were added very slowly while cooling. The resultant mixture was agitated for a period of 10 minutes. 150 cc. of a saturated solution of sodium sulfate were added while cooling and the mixture was allowed to stand at room temperature for a period of an hour. The mixture was then poured into water. The aqueous phase was decanted. The ethereal phase was washed with a saturated solution of sodium sulfate, dried over magnesium sulfate, filtered and evaporated to dryness under vacuum. The residue consisted of the 11α-boranic derivative which was utilized without further purification for the rest of the synthesis.

The product obtained above was introduced into 140 cc. of tetrahydrofuran. 70 cc. of 3 N methanolic potassium hydroxide were added and then 56 cc. of perhydrol were added and the mixture was agitated at room temperature for a period of 1 hour. After the addition of 140 cc. of water and a short period of agitation, 8β-methyl-5α-pregnane-3β,11α,20β-triol (XVI) crystallized. The solvents were removed under vacuum. The product was vacuum filtered, washed with water and dried. 7.6 g. of product were obtained which was purified by a transformation into the triacetate and saponification of the latter.

For this 7.6 g. of the above product were dissolved in 36 cc. of pyridine and 30 cc. of acetic acid anhydride and the mixture was heated to 60° C. for a period of 1 hour. Water was slowly added. The mixture was iced and the tri-acetate of 8β-methyl-5α-pregnane-3β,-11α,20β-triol was vacuum filtered. The product was recrystallized from methylene chloride. The product was obtained in a yield of 72% and had a melting point of 165° C. and had a specific rotation $[\alpha]_D^{20}=-67°$ (c.=1% in chloroform). The product occurred in the form of white prismatic crystals, slightly soluble in alcohol and ether, soluble in acetone and chloroform.

*Analysis.*—$C_{28}H_{44}O_6$; molecular weight=476.63. Calculated: C, 70.55%; H, 9.31%. Found: C, 70.8%; H, 9.2%.

This compound is not described in the literature.

13.7 g. of the triacetate of 8β-methyl-5α-pregnane-3β,11α,20β-triol were introduced into 70 cc. of methanol and 208 cc. of 3 N methanolic potassium hydroxide and the mixture was heated to reflux under agitation for a period of 30 minutes. Water was added to the mixture and the mixture was heated to reflux for a period of 30 minutes, cooled and agitated. The 8β-methyl-5α-pregnane-3β,11α,20β-triol (XVI) was vacuum filtered. The product had a melting point of 160° C., then 198° C. and a specific rotation $[\alpha]_D^{20}=-84°\pm3°$ (c.=0.5% in ethanol). The yield was 96%. The product occurred in the form of white rectangular crystals, soluble in alcohol, insoluble in ether and chloroform.

*Analysis.*—$C_{22}H_{38}O_3$; molecular weight=350.52. Calculated: C, 75.38%; H, 10.93%. Found: C, 75.3%; H, 10.6%.

This compound is not described in the literature.

*Step P.—8β-Methyl-5α-Pregnane-3,11,20-Trione (XVII)*

9.65 g. of 8β-methyl-5α-pregnane-3β,11α,20β-triol were dissolved in 800 cc. of pure acetone. The solution was cooled to −5° C. Then very slowly 21.5 cc. of a 27% chromic Heilbron solution (aqueous solution containing 27 g. of chromic acid and 23 cc. of sulfuric acid per 100 cc.) were introduced. The mixture was agitated for a period of 10 minutes, then filtered, poured into ice water containing 10% methanol and the acetone was removed under vacuum and the precipitated product was vacuum filtered. 7.56 g. of 8β-methyl-5α-pregnane-3,11,20-trione were recovered which was recrystallized from methylene chloride with a yield of 86%.

The product occurred in the form of white hexagonal crystals, soluble in acetone, chloroform and alcohol, slightly soluble in ether and having a melting point of 176° C. and a specific rotation $[\alpha]_D^{20}=+89°$ (c.=0.5% in chloroform).

*Analysis.*—$C_{22}H_{32}O_3$; molecular weight=344.48. Calculated: C, 76.70%; H, 9.36%; O, 13.93%. Found: C, 76.7%; H, 9.3%; O, 14.1%.

This compound is not described in the literature.

*Step Q.—3-Ethylene Ketal of 8β-Methyl-5α-Pregnane-3,11,20-Trione (XVIII)*

7.8 g. of 8β-methyl-5α-pregnane-3,11,20-trione were introduced into a mixture of 156 cc. of methylene chloride and 156 cc. of chloroform under an atmosphere of nitrogen. 78 cc. of the solvents were distilled therefrom under an atmospheric pressure. 78 cc. of glycol were added and 40 cc. of solvents were distilled therefrom. Then 0.390 g. of p-toluene sulfonic acid was introduced and the distillation continued for a period of 5 minutes. After cooling, the mixture was poured into water saturated with sodium bicarbonate and agitated. The aqueous phase was decanted and extracted with methylene chloride. The combined organic phases had several drops of pyridine added thereto and were evaporated to dryness under vacuum. The residue was crystallized from petroleum ether and furnished 6.34 g. of the 3-ethylene ketal of 8β-methyl-5α-pregnane-3,11,20-trione, having a melting point of 130° C. and a specific rotation $[\alpha]_D^{20}=+58°$ (c.=1% in chloroform).

The product occurred in the form of white crystals, soluble in ether and chloroform, slightly soluble in alcohol and insoluble in water.

*Analysis.*—$C_{24}H_{36}O_4$; molecular weight=388.53. Calculated: C, 74.19%; H, 9.34%. Found: C, 74.6%; H, 9.3%.

Starting from the mother liquors, one could recover after acid hydrolysis, 2.23 g. of the starting product.

The product is not described in the literature.

*Step R. — 8β-Methyl-5α-Pregnane-17α-Ol-3,11,20-Trione (XIX)*

8.8 g. of potassium scrapings were dissolved in 365 cc. of tertiary butanol at reflux temperature. 365 cc. of anhydrous benzene were added and the solution was cooled to —2° C. Then 14.6 g. of 3-ethylene ketal of 8β-methyl-5α-pregnane-3,11,20-trione (XVIII) were added. A stream of oxygen was passed therethrough until absorption of 905 cc. and a yellow solution of the 3-ethylene ketal of 17α-hydroperoxy-8β-methyl-5α-pregnane-3,11,20-trione was obtained.

45 g. of zinc, then 90 cc. of acetic acid were added to this solution. The solution was agitated for a period of 15 minutes. The zinc was filtered and water was added. The solvents were removed under vacuum. The residual mixture was extracted with methylene chloride and the extracts were washed successively with water, with a solution of sodium bicarbonate and water, dried and evaporated to dryness under vacuum.

The residue was introduced into 45 cc. of hot acetic acid. 45 cc. of water were added and the mixture was heated on a water bath for a period of 30 minutes. After cooling, the 8β-methyl-5α-pregnane-17α-ol-3,11,20-trione precipitated. It was vacuum filtered, recrystallized from methanol and 6.8 g. of product were obtained, having a melting point of 266–268° C. and a specific rotation $[\alpha]_D^{20}=-4.5°\pm1°$ (c.=1% in chloroform).

The product occurred in the form of colorless prisms, soluble in chloroform, slightly soluble in alcohol and ether and insoluble in water.

*Analysis.*—$C_{22}H_{32}O_4$; molecular weight=360.48. Calculated: C, 73.30%; H, 8.95%. Found: C, 73.0%; H, 8.9%.

This compound is not described in the literature.

*Step S.—8β-Methyl-Δ$^{1,4}$-Pregnadiene-17α-Ol-3,11,20-Trione (XX)*

2.16 g. of 8β-methyl-5α-pregnane-17α-ol-3,11,20-trione were dissolved in 120 cc. of hot acetic acid. The mixture was cooled to +10° C. and then slowly 12.6 cc. of a solution of 16% bromine in acetic acid were added. The resultant solution was agitated for a period of 30 minutes at room temperature. It was poured into 500 g. of a mixture of water and ice containing 2 g. of sodium acetate. The solution was extracted with methylene chloride. The extracts were washed with water saturated with sodium bicarbonate and with pure water, dried and evaporated to dryness under vacuum. The residue was subjected directly to dehydrobromination.

The residue was introduced into 20 cc. of dimethylformamide under an atmosphere of nitrogen. 2.16 g. of lithium carbonate and 1.76 g. of lithium bromide were added and the mixture was heated while agitating to 125° to 135° C. for a period of 3 hours. After the addition of water containing 10% of acetic acid, the mixture was extracted with methylene chloride. The extracts were washed with water, dried and evaporated to dryness under vacuum. The residue crystallized from ether supplied 1.3 g. of 8β-methyl-β$^{1,4}$-pregnadiene-17α-ol-3,11,20-trione (XX) which was purified by treatment with reactant P.

For this the product obtained was dissolved in 13 cc. of methylene chloride and 6.3 cc. of methanol. 650 mg. of the hydrazide of pyridium acetic acid were added and the mixture was agitated for 15 minutes at room temperature. It was poured into water containing a small amount of sodium bicarbonate. The methylene chloride solution was decanted, washed with water, dried, filtered and concentrated to a small volume. The mass obtained was disintegrated with ether. The precipitated product was vacuum filtered and 1.14 g. of product were obtained having a melting point of 280° C.

The purified 8β-methyl-Δ$^{1,4}$-pregnadiene-17α-ol-3,11,20-trione (XX) occurred in the form of colorless crystals, soluble in chloroform, very slightly soluble in alcohol and insoluble in ether and water.

*U.V. spectra.*—λ max. at 240–241 mμ

$$-E_{1\,cm.}^{1\%}=339-\epsilon=12,100$$

This compound is not described in the literature.

*Step T.—8β-Methyl-Δ$^1$-Cortisone and its Acetate (XXI, with* R=H *and* R=$COCH_3$)

450 mg. of 8β-methyl-Δ$^{1,4}$-pregnadiene-17α-ol-3,11-20-trione were introduced into a mixture of 1.4 cc. of anhydrous methanol, 2.7 cc. of anhydrous carbon tetrachloride and 450 mg. of quick lime. Within the space of a half hour, in small fractions, 1.8 cc. of a solution of iodine containing 3.7 g. of iodine per 10 cc. of methanol containing 5% calcium chloride were added. The clear yellow suspension which resulted was poured into 30 cc. of ice containing 0.3 cc. of acetic acid and agitated for a period of 10 minutes. The precipitated product, 8β-methyl-21-diiodo-Δ$^{1,4}$-pregnadiene-17α-ol - 3,11,20 - trione, was vacuum filtered, washed with water, then with carbon tetrachloride and dried under vacuum.

Then 900 mg. of potassium acetate in 3 cc. of acetone were heated to reflux to which 0.2 cc. of acetic acid and 0.8 cc. of dimethylformamide were added until a solidification occurred. The product obtained by the iodation was added to this mixture and the heating at reflux was continued for a period of 35 minutes. After the addition of water, the acetone was removed under vacuum and the aqueous solution extracted with methylene chloride. The extracts were washed with water, dried, filtered and evaporated to dryness under vacuum. The residue was recrystallized from methanol. 120 mg. of the acetate of 8β-methyl-Δ$^1$-cortisone were obtained having a melting point of 284–285° C. and a specific rotation $[\alpha]_D^{20}=+140°\pm1°$ (c.=0.17% in chloroform).

The product occurred in the form of white prismatic crystals, slightly soluble in chloroform, very slightly soluble in acetone and alcohol and insoluble in ether and water.

*Analysis.*—$C_{24}H_{30}O_6$; molecular weight=414.48. Calculated: C, 69.54%; H, 7.30%. Found: C, 69.6%; H, 7.4%.

*U.V. spectra.*—λ max. at 242 mμ:

$$E_{1\,cm.}^{1\%}=351-\epsilon=14,550$$

This compound is not described in the literature.

By the saponification of the product obtained above by means of potassium carbonate in methanolic solution, the 8β-methyl-Δ$^1$-cortisone was obtained (XXI, with R=H).

The 8β-methyl-Δ$^1$-cortisone may be esterified by action of the anhydrides or chlorides of acids such as those of trimethyl acetic acid, cyclopentyl acetic acid, phenyl acetic acid, propionic acid, oenanthic acid, undecylenic acid, benzoic acid, 3,4,5-trimethoxy benzoic acid, etc., while operating in the presence of a tertiary base, such as, pyridine into the corresponding esters.

Various modifications of the process of the invention may be made without departing from the spirit or scope thereof, and it is to be understood that the invention is to be limited only as defined in the appended claims.

We claim:

1. 3-acetoxy-20β-benzoyloxy-Δ$^{3,5}$-pregnadiene-11-one.

2. 20β-benzoyloxy-$\Delta^5$-pregnene-3β-ol-11-one.

3. 3β-acetoxy-20β-benzoyloxy-$\Delta^5$-pregnene-11-one.

4. 3β-acetoxy-20β-benzoyloxy-$\Delta^5$-pregnene-7,11-dione.

5. 3β-acetoxy-20β-benzoyloxy-5α-pregnane-7,11-dione.

6. 20β-benzoyloxy-5α-pregnane-3β-ol-7,11-dione.

7. 7 - ethylenedioxy - 20β - benzoyloxy-5α-pregnane-3β-ol-11-one.

8. 7 - ethylenedioxy - 20β-benzoyloxy-5α-pregnane-3β, 11β-diol.

9. 3β,20β - dibenzoyloxy - 7 - ethylenedioxy-5α-pregnane-11β-ol.

10. 3β,20β - dibenzoyloxy - 7 - ethylenedioxy-$\Delta^{9(11)}$-5α-pregnene.

11. 3β,20β-dibenzoyloxy-$\Delta^{9(11)}$-5α-pregnene-7-one.

12. A compound having the formula

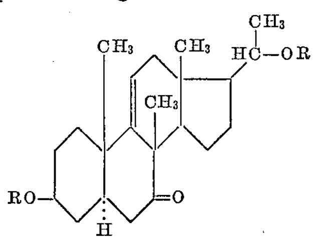

wherein R is selected from the group consisting of hydrogen and an acyl radical of an organic carboxylic acid having 1 to 18 carbon atoms.

13. 3β,20β - dibenzoyloxy - 8β - methyl-$\Delta^{9(11)}$-5α-pregnene-7-one.

14. 8β-methyl-$\Delta^{9(11)}$-5α-pregnene-3β,20β-diol-7-one.

15. 8β-methyl-$\Delta^{9(11)}$-5α-pregnene-3β,20β-diol.

16. 8β-methyl-5α-pregnane-3β,11α,20β-triol.

17. 3β,11α,20β-triacetoxy-8β-methyl-5α-pregnane.

18. The 3-ethylene ketal of 8β-methyl-5α-pregnane-3, 11,20-trione.

19. The 3-ethylene ketal of 17α-hydroperoxy-8β-methyl-5α-pregnane-3,11,20-trione.

20. 8β - methyl - 21 - diiodo - $\Delta^{1,4}$-pregnadiene-17α-ol-3,11,20-trione.

21. A process for the preparation of compounds having the formula

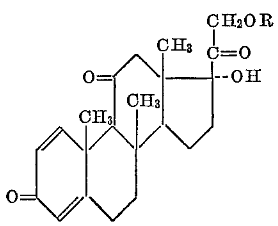

wherein R is selected from the group consisting of hydrogen and an acyl radical of an organic carboxylic acid having 1 to 18 carbon atoms which comprises (a) Reacting 20β - aroyloxy - $\Delta^4$ - pregnene-3,11-dione wherein the aroyloxy group is derived from a monocyclic aryl carboxylic acid with an acylating agent of a lower aliphatic acid to form 3-acyloxy-20β-aroyloxy-$\Delta^{3,5}$-pregnadiene-11-one, (b) simultaneously reducing and saponifying the latter with an alkali metal mixed hydride to form 20β-aroyloxy-$\Delta^5$-pregnene-3β-ol-11-one, (c) esterifying the latter with an acrylating agent of a lower aliphatic acid to obtain 3β-acyloxy-20β-aroyloxy-$\Delta^5$-pregnene-11-one, (d) oxidizing the latter with a chromic acid oxidizing agent to form 3β-acyloxy-20β-aroyloxy-$\Delta^5$-pregnene-7,11-dione, (e) catalytically hydrogenating the latter in the presence of a palladium catalyst to form 3β-acyloxy-20β-aroyloxy-5α-pregnane-7,11-dione, (f) hydrolyzing the latter to form 20β-aroyloxy-5α-pregnane-3β-ol-7,11-dione, (g) reacting the latter with an alkylene glycol to form 7-alkylene-dioxy-20β-aroyloxy-5α-pregnane-3β-ol-11-one, (h) reducing the latter to form 7-alkylene-dioxy-20β-aroyloxy-5α-pregnane-3β,11β-diol, (i) esterifying the latter with an acylating agent of a monocyclic aryl carboxylic acid to form 3β,20β-diaroyloxy-7-alkylene-dioxy-5α-pregnane-11β-ol, (j) dehydrating the latter to form 3β,20β-diaroyloxy-7-alkylene-dioxy-$\Delta^{9(11)}$-5α-pregnene, (k) hydrolyzing the latter to form 3β,20β-diaroyloxy-$\Delta^{9(11)}$-5α-pregnene-7-one, (l) reacting the latter with a methyl halide to form 3β,20β - diaroyloxy - 8β - methyl-$\Delta^{9(11)}$-5α-pregnene-7-one, (m) saponifying the latter to form 8β-methyl-$\Delta^{9(11)}$-5α-pregnene-3β,20β-diol-7-one, (n) reducing the latter with anhydrous hydrazine to form 8β-methyl-$\Delta^{9(11)}$-5α-pregnene-3β,20β-diol, (o) reacting the latter with first diborane at room temperatures for about 15 to 20 minutes and then hydrogen peroxide to form 8β-methyl-5α-pregnane-3β,11α, 20β-triol, (p) oxidizing the latter to form 8β-methyl-5α-pregnane-3,11,20-trione, (q) reacting the latter with a lower alkylene glycol to form 3-alkylene-dioxy-8β-methyl-5α-pregnane-11,20-dione, (r) oxidizing the latter with oxygen to form 3-alkylene-dioxy - 17α - hydroperoxy - 8β - methyl-5α-pregnane-11,20-dione, (s) simultaneously reducing and hydrolyzing the latter with an acidic metal reducing agent to form 8β-methyl-5α-pregnane-17α-ol-3,11,20-trione, (t) brominating and dehydrobrominating the latter to to form 8β-methyl-$\Delta^{1,4}$-pregnadiene-17α-ol-3,11,20-trione, (u) reacting the latter with iodine to form 8β-methyl-21-diiodo-$\Delta^{1,4}$-pregnadiene-17α-ol-3,11,20-trione, (v) reacting the latter with an alkali metal acetate to form 8β-methyl-21-acetoxy-$\Delta^{1,4}$-pregnadiene-17α-ol-3,11,20-trione, (w) saponifying the latter to form 8β-methyl-$\Delta^1$-cortisone and (x) recoverying the product of the above formula.

References Cited in the file of this patent

UNITED STATES PATENTS

| | | |
|---|---|---|
| 2,778,776 | Wettstein et al. | Jan. 22, 1957 |
| 2,902,410 | Weintraub et al. | Sept. 1, 1959 |